United States Patent Office.

WILLIAM R. STACE AND HAYDN M. BAKER, OF ROCHESTER, NEW YORK, ASSIGNORS TO THEMSELVES, JOHN A. MORRISON, SEWARD F. GOULD, AND JOSEPH EASTWOOD.

Letters Patent No. 68,254, dated August 27, 1867.

IMPROVED PROCESS TO BE USED IN THE MANUFACTURE OF GLASS, SOLUBLE SILICATES, HYDROCHLORIC ACID, AND BLEACHING-POWDERS.

The Schedule referred to in these Letters Patent and making part of the same.

TO ALL WHOM IT MAY CONCERN:

Be it known that we, WILLIAM R. STACE and HAYDN M. BAKER, of Rochester, county of Monroe, State of New York, have invented new and useful Processes for the Manufacture of Glass, Soluble Silicate of Soda, Hydrochloric Acid, and Bleaching-Powders, (chloride of lime,) which we verily believe has not before been known or used, and that the following is a full and exact description thereof.

The nature of our invention consists in the decomposition of chloride of sodium with the vapors of water at elevated temperatures in the presence of silicic acid in clay retorts.

When vapors of water are used, the products formed will be silicate of soda and hydrochloric acid. When sand and chloride of sodium are charged into the retort, and atmospheric air, which has been previously heated (or superheated) is made to pass through the mixture, the products will be silicate of soda, chlorine and nitrogen gases. The gases are passed through a lead-lined chamber, over trays containing hydrated quicklime, the chlorine combining with the lime-forming chloride of lime, while the nitrogen passes out into the air.

To enable others skilled in the chemic art to make use of our invention, we will proceed to describe it in detail.

We first provide ourselves with retorts made of Stourbridge clay, in the same manner as the pots used in glass manufacture, except that the said retorts are provided with an outlet at the bottom for discharging, and also for the admission of a clay pipe, through which the superheated steam or air is made to pass into the mixture at the bottom. The outlet at the top is used for charging and the admission of a pipe, through which the liberated gases are made to pass on to the condensers. These retorts are placed in a furnace or furnaces, built of fire-brick, and capable of sustaining high temperatures. The temperatures are to be raised very gradually, until the retort has attained a very elevated temperature. This is done to avoid breaking or cracking the retort.

When we desire to make glass, we mix the silicic acid (sand) and chloride of sodium (salt) with the acid in excess, or (expressed in chemical language) the proportions are used which will form a ter-silicate or quadro-silicate, or any other proportion which will form a perfectly vitreous insoluble silicate.

To make soluble silicate, we mix the silicic acid, or sand, and chloride of sodium, or salt, in such proportions as to form a mono-silicate of soda, or any proportion necessary to furnish any desired soluble silicate. After the batch is mixed, it is first passed through a mill for the purpose of reducing it to a very fine state of division, to afford opportunities of intimate contact of the sand with the salt. The batch is now charged into the retort, while the same is at as elevated a temperature as practicable. The retort is closed and luted as quickly as possible, and the batch allowed to remain until it has acquired an elevated temperature, when steam from the superheater is admitted at or near the bottom of the retort on the inside, and allowed to pass up through the batch and on to the condensing apparatus. When the steam or vapors of water come in contact with the batch, consisting of sand and chloride of sodium, a part of the steam is decomposed, the oxygen uniting with the sodium to form soda, and the hydrogen combining with the chlorine to form hydrochloric acid, which is carried to the condensing apparatus by the excess of steam, while the sand (silicic acid) unites with the soda, forming silicate of soda. The silicate of soda may be withdrawn into water, in which it dissolves, and may be used for any industrial purpose for which it is applicable. If the proportions necessary in the formation of glass have been used, then the glass may be worked out, and used in the usual manner.

If we desire to manufacture chlorine gas instead of hydrochloric acid, we use heated air in the place of steam. The air furnishes oxygen to the sodium-forming soda, while chlorine from the sodium and nitrogen from the air, are driven on through the condensing and washing apparatus, thence on through the chambers filled with trays and loaded with hydrated lime. The chlorine is absorbed by the lime, while the nitrogen is allowed to pass out into the atmosphere.

The advantages of this invention are that it furnishes a cheap source for the alkali soda and the production of hydrochloric acid and bleaching-powders (chloride of lime) and glass.

*Claim.*

What we claim as our invention, and desire to secure by Letters Patent, is—

The application to the manufacture of glass, soluble silicate of soda, bleaching-powders, and hydrochloric acid of the processes herein described for the decomposition of chloride of sodium with silicic acid and oxygen gas at elevated temperatures, whether said oxygen gas be furnished in the manner herein described, (from steam or air,) or from chlorate of potash, peroxide of manganese, caustic baryta, or any other of the usual modes.

WILLIAM R. STACE,
HAYDN M. BAKER.

Witnesses:
DE L. CRITTENDEN,
E. S. YOUNG.